Figure 1A:
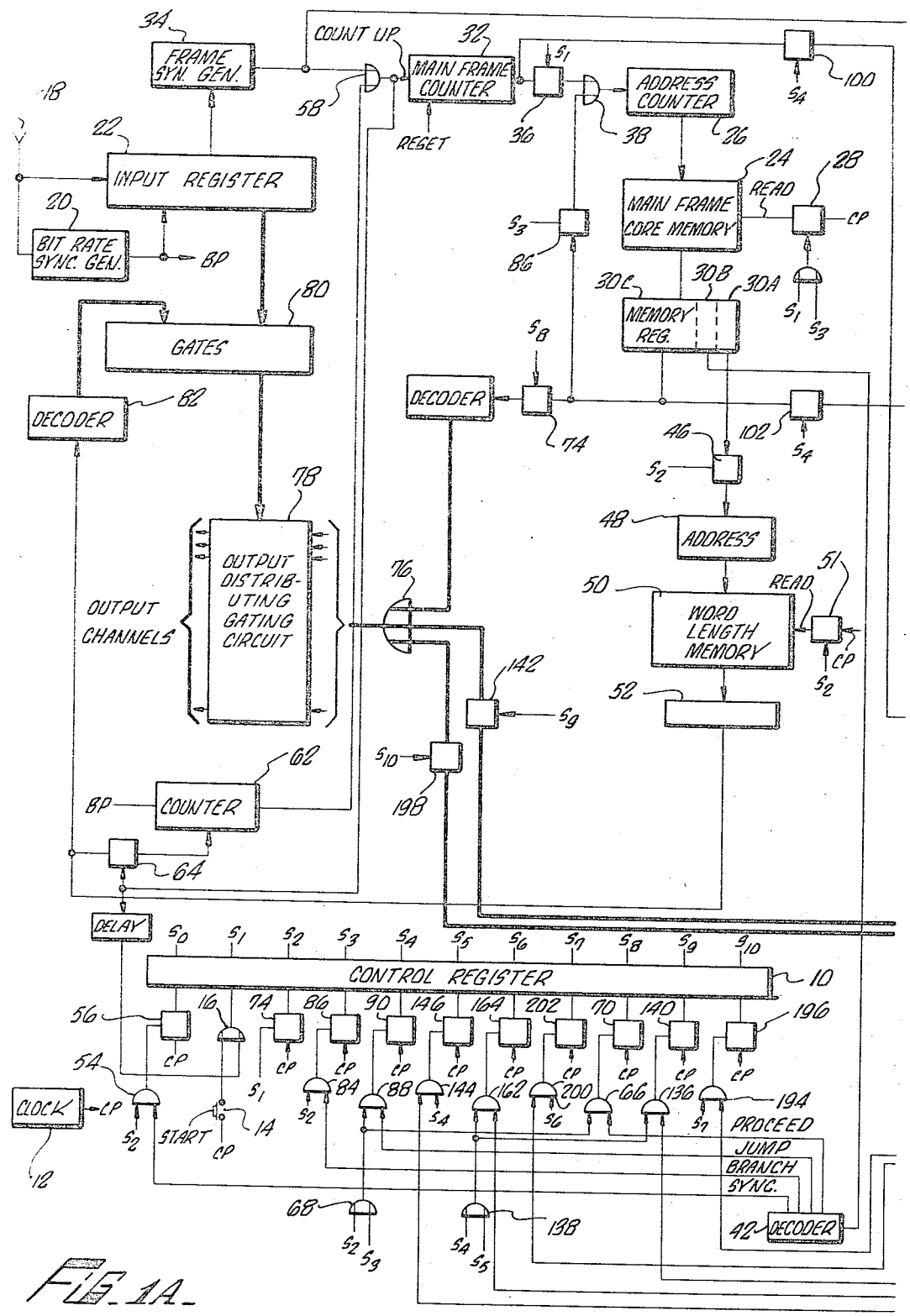

United States Patent Office 3,344,409
Patented Sept. 26, 1967

3,344,409
DECOMMUTATOR FOR USE IN PULSE CODE MODULATED TELEMETRY
Michael J. Townsend, Upland, Calif., assignor to Consolidated Systems Corporation, Pomona, Calif., a corporation of California
Filed Mar. 29, 1965, Ser. No. 443,251
8 Claims. (Cl. 340—172.5)

This invention relates to telemetry decommutation and, more particularly, is concerned with decommutation of a pulse code modulated signal.

The use of pulse code modulated telemetry for communicating data from airborne or space vehicles back to the ground is well known. Measurements of parameters such as pressure, temperature, acceleration, radiation and so forth are sequentially sampled and converted to digital pulse representations of their values. The sampling sequence is controlled by a commutating circuit at the source which connects each one of a plurality of input channels in sequence to a common output. The resulting serial string of binary coded bits is transmitted back to a ground station, for example, where the string of pulses goes through a decommutation process to identify each data sample and relate it to its source.

The sampling rate of a particular measurement at the source must be faster than the rate of change of a parameter being measured. If the sampling rate were made uniform for all parameters being measured, the sampling rate would then be dictated by the parameter having the highest rate of change. This would mean that many more data samples would be generated than required for the measured parameters which vary at a much slower rate. In order to avoid the inefficiency of transmitting more data than is absolutely necessary to determine variations in the parameters being measured, commutation techniques known as channel-strapping and sub-commutation have been developed.

In channel-strapping, selected ones of the measurement input channels to the commutator are connected together to one parameter measuring source. By this technique, the one parameter is sampled more often than other parameters as the commutator goes sequentially from input channel to input channel. For example, if every fourth input channel to the commutator were connected together to the same signal source, every fourth data sample in sequence of samples from the output of the commutator would relate to the same measurement source. Thus during one complete scan by the commutator, many samples of that particular source would be produced rather than the single sample which would be generated without channel-strapping.

In sub-commutation, each input channel of a commutator is in turn connected to the output of a sub-commutator. The sub-commutator advances from one input channel to the next input channel only when the main commutator completes a sampling scan of all its input channels. Thus each time the main commutator samples a particular input channel which in turn is connected to the output of a sub-commutator, a different parameter measurement may be sampled. The sub-commutation technique provides a much lower sampling rate of the inputs to the sub-commutator than the sampling rate of the inputs to the main commutator. It will be appreciated that this same technique can in turn be applied to a sub-sub-commutator and that channel-strapping can be effected in any sub-commutator or any sub-sub-commutator.

Using bit rates of up to 1 megacycle per second, it will be appreciated that high speed commutation systems generate great masses of data. The problem of the decommutator is to group these information bits into words representing one complete data sample which in turn can be decoded. The decoded measurements must be identified by their sequential position in the input data string as to their original source. Because the data itself does not contain any information identifying the source, the source can only be determined from the sequence of data. Where cross-strapping and sub-commutation is employed, the decommutator must be able to take into account the cross-strapping and sub-commutation arrangement in identifying the source associated with each coded word of information. The flexibility of the system requires that the cross-strapping and sub-commutation arrangement can be varied from installation to installation and the decommutator at the ground station must be readily modified to accommodate the particular arrangement at the sending station.

Not only must the decommutating station be readily modified to accommodate different formats of commutators using cross-strapping and sub-commutation, the ground station should be adaptable to handle varying word lengths for each word of information transmitted. In pulse code modulation, the number of bits in a word determines the accuracy of the information in the particular sample of the measurement being made. Obviously, some information requires greater accuracy than other information. To reduce the number of bits of information transmitted to the absolute minimum, the system should accommodate varying word lengths for measurements of varying accuracy.

The decommutator not only must be able to separate out the words of information from the string of bits being received, group it into varying word lengths and identify the source of each word, but it must be designed to direct the information contained in each word to a selected output channel. Normally, all of the information bits are recorded on magnetic tape as they are received from the remote station. The decommutator is designed to strip out several preselected channels at one pass of the magnetic tape for display on strip charts or other analog recording devices. In this way, particular channels or the periods of interest can be selected for detailed analysis.

The present invention is directed to a decommutating system which can be readily programmed to accommodate any format of input information and which can select for output a large number of information channels out of the very large number of possible channels which can be established by the commutator. For example, the decommutation system may accommodate a commutator at the source having up to three levels of commutation, i.e., a main commutator, a sub-commutator, and a sub-sub-commutator level. The present invention further provides a decommutator that may accommodate, by way of example only, up to 512 input channels for each commutation level. While no actual commutator would include at one time all $512^3$ input channels of information, the decommutator, to provide complete flexibility, must be capable of handling any possible combination of input channels that might be required for a given operation.

In brief, the present invention provides a decommutation apparatus which includes three separate digitally coded addressable memory units. These three units are associated in the manner in which they function respectively with decommutation of information data derived from input channels of the main commutator, the sub-commutators, and the sub-sub-commutators at the transmitting source. Prior to operation of the decommutator with a particular telemetering source, these memory units are loaded with control words which are coded to designate the disposition of selected data words as they are received from the source. The first memory unit, which may be called the main decommutation memory unit, contains control words relating to each of the input channels of the main commutator. As the main commutator samples the input channels in sequence at the source, so also in the main commutator memory unit addressed in sequence to read out a control word for each data sample as it is received. The control word defines the length of the data word being received so that it can be identified within the string of binary bits being received and the control word designates the destination of the data, whether it be to a digital-to-analog converter or other output distribution.

Where there has been cross-strapping between input channels of the main commutator at the source, the control word read out of the memory is used to address another control word which in turn defines the output destination of the highest order input channel of the series of cross-strapped input channels at the main commutator.

If a particular input channel of the main commutator in turn is connected to the output of a sub-commutator, the control word derived from the main commutator memory unit is used to address the sub-commutator memory unit. A control word is thereby derived corresponding to the particular input channel of the sub-commutator which has been sampled and to which the data word under consideration at the decommutator has been derived. The control word derived from the sub-commutator memory unit may designate an output destination, may address another control word within the sub-commutator memory unit in the case of where cross-strapping of the sub-commutator at the source has been provided, or may in turn address the sub-sub-commutator memory unit, as in the case where the input channel to the sub-commutator in turn is connected to the output of a sub-sub-commutator at the source. The control word from the output of the sub-sub-commutator may then in turn designate the output destination or address another control word in the sub-sub-commutator memory unit, as in the case of cross-strapping at the sub-sub-commutator level at the source.

One of the significant features of the present invention is the use of associative memories for the sub-commutator and sub-sub-commutator memory units. An associative memory differs from a conventional memory in that its content is directly addressable. When a binary coded address word is presented to the associative memory, the memory compares the word with all those words or designated portions of all those words stored in the associative memory. The associative memory provides the address of the word on which a comparison is made and also can be used to read out the complete word on which a comparison is made. The advantage of the associative memory in the decommutation system is derived from the fact that there need not be a control word for every data word received. Under a particular output format, control words need to be provided only for those particular data words from the source that are of immediate interest. By employing associative memories, only a limited number of addresses are required to make an association on the corresponding limited number of control words required to select and dispose of the data words that are of interest. Since in the associative memory, the addresses are included as part of the control words, the addresses are changed by loading a different format of control word in the associative memory units at the start of a data run in order to select different particular data words as the situation requires.

Figure 1B:
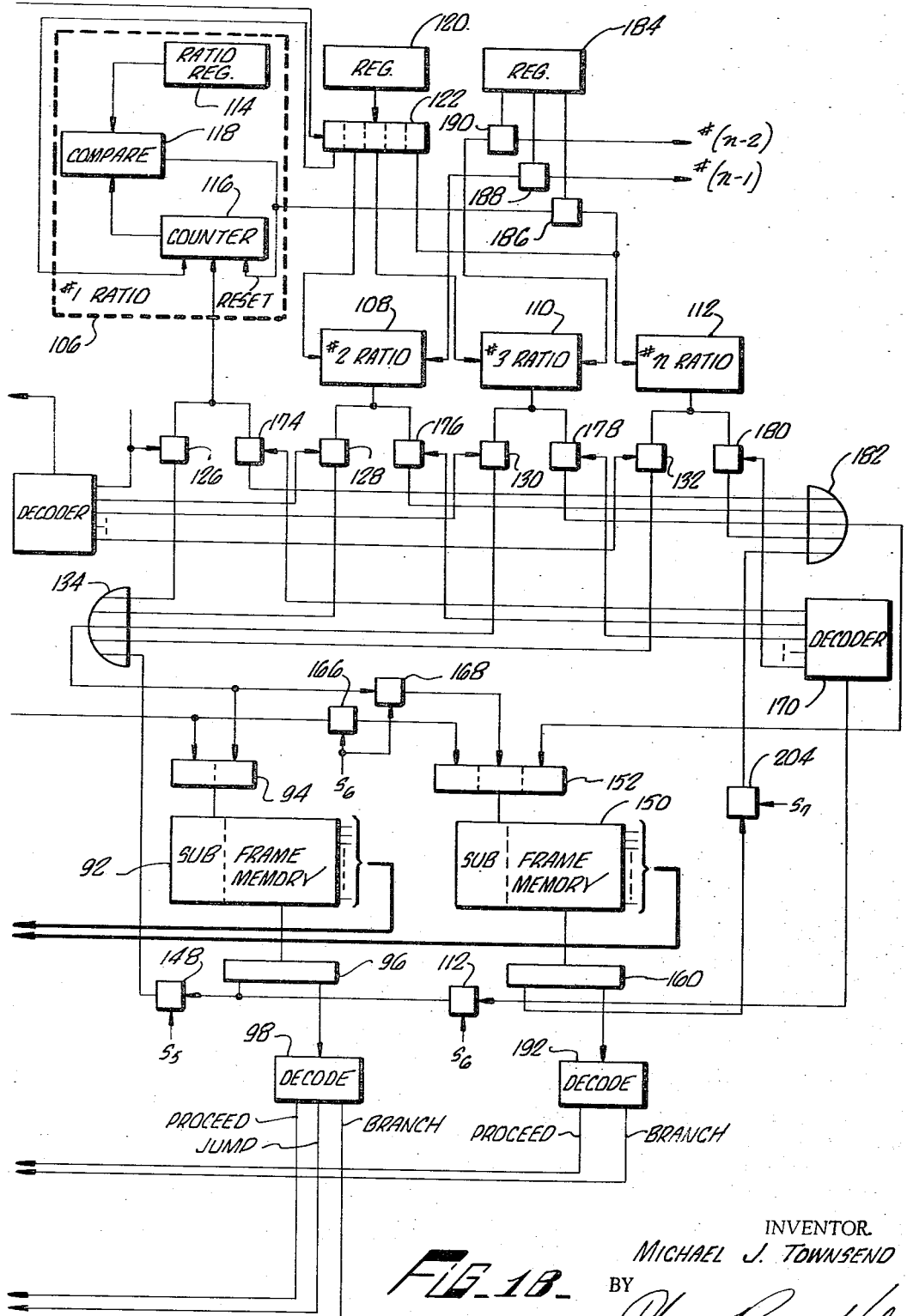

For a more complete understanding of the invention, reference should be made to the accompanying drawing wherein:

FIGURES 1A and 1B are a schematic block diagram of a decommutator system incorporating the features of the present invention.

Referring to the drawing in detail, the numeral 10 indicates generally a control register which can be set to any one of a series of states, designated $S_0$ through $S_{10}$. The control register establishes the control states necessary to carry out the decommutation process for each data word received from the telemetering source. The control register is initially in the $S_0$ state and is not advanced to the $S_1$ state until a clock pulse from a clock pulse generator 12 is applied through a start switch 14 to the control register 10 through an OR gate 16. By operating the start switch 14, and placing the control register in the $S_1$ state, operation of the decommutator system is initiated.

The pulse code modulated information to be decommutated is applied to an input terminal 18 in serial fashion at a rate determined by the telemetering source in real-time operation or a rate determined by the recorder when the data is recorded initially on tape and then played back. For the purpose of the present description, the binary coded information is assumed to be in the form of a pulse to represent a binary one and the absence of a pulse to represent a binary zero, although other forms of binary coding may be adopted. A bit rate sync generator, in response to the pattern of pulses applied to the input 18, regenerates the bit rate, providing synchronizing output pulses, designated BP, for each bit position in the serial string of input information. These bit pulses are used to shift an input register 22 to which the input terminal 18 is connected. In this manner, the serial string of input information pulses is continuously shifted serially through the input register 22 as it is received. The register 22 is designed to store the maximum number of bits required to constitute a full data word.

A sequence of binary bits representing a single piece of information is hereinafter referred to as a data word. These words may be of any length, for example, from four bits up to sixty-four bits in length. The input register 22 is designed to accommodate the longest word. In addition to the data words, a synchronizing signal is provided as part of the input information to designate the start of a main frame decommutation cycle. Thus, the synchronizing signal is generated whenever the main commutator at the source completes one scan of the main frame commutator inputs.

Since the first word to be received by the decommutator system is a synchronizing word, means must be provided for recognizing the number of bits and the pattern of the bits comprising the synchronizing word. This information is stored initially in a main frame core memory 24. The core memory 24 is of conventional design and stores a plurality of binary coded words in addressable memory locations. An address register 26 establishes the address of the stored information and in response to a pulse applied to the Read input through a gate 28, the word in the particular location identified by the contents of the address register 26 is transferred into a memory register 30.

Separate control words are stored in the main frame core memory 24 for the synchronizing word and for each of the data words occurring between synchronizing words. A main frame counter 32 provides a means of addressing these control words in sequence. The main frame counter is counted up one whenever a synchronizing word is sensed in the input register by a frame sync generator 34. The frame sync generator 34 is a conventional digital comparison circuit designed to identify a particular pattern of binary bits in the input register 22 by comparing with a pattern of binary bits stored in the sync generator. An output pulse is generated whenever the correct pattern of bits is identified by the comparison. Thus the frame sync generator 34 puts out a pulse whenever a predetermined sync word passes through the input register 22.

Initially, the main frame counter 32 is reset to its zero count condition. When the control register 10 is set to the $S_1$ state by actuating the start button 14, this initial count condition of the counter 32 is transferred to the address register 26 by means of a gate 36, turned on by $S_1$ level of the control register, through an OR circuit 38. The $S_1$ state is also applied through an OR circuit 40 to the gate 28. The next clock pulse from the clock source 12 applied to the gate 28 actuates the core memory 24 to read out the selected word into the memory register 30. As will hereinafter be more fully explained, this control word includes a first address portion, an order portion which designates the particular operation to be performed by the decommutator system, and a portion designating a second address.

The order portion of the control word in the memory register 30 is applied to a decoder 42. The order portion may designate by means of different outputs from the decoder 42 whether a synchronizing operation is to take place, whether a Branch operation should take place, whether a Jump operation should take place, or whether the decommutator should proceed to the next decommutating operation. These four conditions are designated by the four output lines from the decoder 42.

The next clock pulse generated by the clock source 12 together with $S_1$ state is applied to a gate 44 associated with the control register 10 for setting the control register 10 to the $S_2$ state. During the $S_2$ state, a gate 46 couples the first address portion of the control word in the memory register 30 to an address register 48 of an associative memory indicated generally at 50. The associative memory provides circuit means for simultaneously comparing a plurality of binary coded words stored in the memory (or any selected portion of the word stored in the memory) with the contents of the address register 48. If an association is made, that word is transferred to a read out register 52. The associative memory 50 is designed to contain, for example, sixteen words, each of which designates a different word length of from four to sixty-four bits. Associative memories are well known in the computer art. See for example the article "Semi-Conductor Circuits in Associative Memories," by E. S. Lee, Proceedings of the Pacific Computer Conference, Mar. 15–16, 1963, pp. 96–108. The associative memory 50 is preloaded to provide the correct word length information for each sync word and main frame data word received from the commutating source.

The decoder 42 in response to the initial sync control word placed in the memory register 30 indicates a synchronizing operation at the output of the decoder 42. This level is applied to an AND circuit 54 together with the $S_2$ state, the output of the AND circuit 54 being applied to a gate 56. The next clock pulse applied to the gate 56 after a sync control word has been placed in the memory register 30 and the word length memory 52 has been addressed, resets the control register 10 back to the $S_0$ state. The decommutator is now ready to receive the first sync word in the telemetered data string at the input register 22.

When this first sync word is shifted to the righthand position of the input register 22, it will be recognized by the frame sync generator 34 which will produce an output sync pulse. This sync pulse from the generator 34 is coupled to the main frame counter 32 through an OR circuit 58, advancing the main frame counter 32 by one. At the same time, the sync pulse is coupled through the OR circuit 58 and through a delay circuit 60 to the logical OR circuit 16 on the input to the $S_1$ position of the control register 10. At the same time, the word length information in the register 52 is transferred to a counter 62 through a gate 64 in response to the sync pulse at the output of the OR circuit 58. The counter 62 is then counted down by bit pulses BP derived from the bit rate sync generator 20. Thus as the sync word is shifted out of the righthand end of the input register 22, the counter 62 is counted down. When the counter 62 reaches zero, the corresponding number of bits in the sync word in the input register have been shifted out of the input register 22 and the first data word is now in the righthand position in the input register 22.

When the control register is again advanced to the $S_1$ state by the sync pulse from the generator 34, a new control word is brought out of the main frame core memory 24 and placed in the memory register 30. Again information is derived from the word length memory 50 and placed in the register 52 to identify the length of the first data word now being shifted into the input register 22. The control word associated with the first data word may order one of three operations by means of the decoder 42. These three operations are labelled "Proceed," "Jump," and "Branch."

The "Proceed" order indicates that the data word is to be transferred to a selected one of a plurality of outputs identified by the first address portion of the control word in the memory register 30. A "Branch" order requires that a new control word be brought out of the memory from the address location identified by the first address portion of the control word in the register 30. A "Jump" order requires that a control word be derived from a sub-frame memory as will hereinafter be fully described.

Consider first the "Proceed" order. This level is derived from the decoder 42 and applied to an AND circuit 66 to which is also applied the $S_2$ state or the $S_3$ state of the control register 10 from an OR circuit 68. Assuming the first data word is coming into the input register 22, the control register will be in the $S_2$ state described immediately above. The output of the AND circuit 66 is applied to a gate 70 by means of which the next clock pulse sets the control register 10 to the $S_8$ state.

During the $S_8$ state of the control register 10, the second address portion of the control word in the memory register 30 is decoded by a decoder 72, the address information being applied from the register 30 to the decoder 72 through a gate 74 during the $S_8$ state. The second address portion of the control word in the memory register 30 designates the desired output distribution of the data word being transmitted to the input register 22. For instance, the output of the decoder circuit 72 may energize one of sixty-four output lines which designate one of sixty-four output distribution points. These output lines from the decoder 72 are coupled through an OR circuit 76 to an output distribution gating circuit 78. The gating circuit 78 is designed to transfer a binary coded word applied in parallel thereto from the input register 22 through a gate 80 to any one of the plurality of output channels designated by the selection lines from the output of the OR circuit 76. The various output channels form no part of the present invention, but typically may be magnetic recording devices, digital-to-analog converters or any other suitable equipment for processing the digitally coded information. The output distributing gating circuit 78 provides a means for transferring a particular data word to any selected one of the output channels as designated by the second address portion of the associated control word in the memory register 30.

When the first data information word is shifted into the righthandmost position of the input register 22, the counter 62 will have been counted by the shifting pulses BP back to zero and an overflow pulse is generated which is applied to the OR circuit 58. The word length information in the register 52 is then transferred by the gate 64 to reload the counter 62. At the same time, the word length information in the register 52 is applied to a decoder 82. The output of the decoder 82 is applied to the gate 80 to control the number of parallel bits transferred from the input register 22 to the output distribution gating circuit 78. In this manner, only the correct number of bits constituting the full data word in the righthand portion of the input register 22 is transferred to the gating circuit 78. This is necessary since the input register may already contain, in the lefthand portion of the register, bits of the following data information word. The "Proceed" operation is completed by the overflow pulse from the counter 62, which is applied to the OR circuit 58 and through the delay circuit 60 to the OR circuit 16 to reset the control register back to the $S_1$ state.

With the control register 10 back in the $S_1$ state, the main frame counter 32 addresses the next control word in the main frame core memory 24, placing it in the memory register 30. As a result, the designated word length is set up at the end of the $S_2$ state in the output register 52 of the associative memory 50, as previously described.

At this juncture, it will be assumed for the purpose of further description of the invention, that the order portion of the control word in the memory register 30 now designates a "Branch" operation at the output of the decoder 42.

The "Branch" line from the decoder 42 is applied to an AND circuit 84 together with the $S_2$ level from the control register 10 so that the next clock pulse is passed by an associated gate 86 to set the control register 10 to the $S_3$ state.

During the $S_3$ state, a gate 86 couples the second address portion of the control word in the memory register 30 to the address register 26. The $S_3$ state is also applied to the gate 28 so that the next clock pulse causes a Read operation from the main frame memory 24 into the memory register 30. As a result, the control word in the memory register 32 is replaced by another control word, the order portion of which again is applied to the decoder 42. The order portion of the new control word may call for a "Proceed" operation, in which case the control register 10 is set to the $S_8$ state in the manner already described above to provide appropriate distribution of the second data word to an output channel.

However, for the present discussion, it may be assumed that the order portion of the new control word now designates a "Jump" operation, setting the appropriate level on the output of the decoder 42. This output level is applied to an AND circuit 88 together with the output of the OR circuit 68. The output of the AND circuit 88 controls a gate 90 so that the next clock pulse passed by the gate 90 sets the control register 10 to the $S_4$ state. The purpose of the "Jump" operator is to transfer control operation of a sub-frame memory, indicated generally at 92. The sub-frame memory 92 is an associative memory similar to the word length memory 50. The associative memory is addressed by the contents of the register 94 and if an association results between the contents of the register 94 and a portion of a word stored in the memory 92, that word is transferred to an output register 96. The contents of the resulting word in the register 96 in turn is used as a control word having an order portion and an address portion.

Addressing of the sub-frame memory 92 takes place during the $S_4$ state by means of a gate 100 which transfers the address in the main frame counter 32 to one part of the address register 94. Also during the $S_4$ state, the second address portion of the control word in the memory register 30 is transferred by means of a gate 102 to a decoder 104. The second address portion of the control word is used to designate one of a plurality of possible ratios between the sub-frame and main frame decommutators. In this respect, it should be noted that the sub-commutators at the source may each be reset after different numbers of cycles of the main commutator. Selected ones of ratio circuits at the decommutators accommodate the different reset conditions established for the sub-commutator at the source. Other ones of the ratio circuits at the decommutator are used to establish the reset condition of the sub-sub-commutators. Ratio circuits for establishing different ratios are indicated generally at 106, 108, 110 and 112. While only four are shown, there may be any number N ratio circuits provided depending on the number of different ratios accommodated by the system. Each of the ratio circuits include a ratio register, a counter and a comparison circuit such as indicated at 114, 116 and 118 respectively in #1 ratio circuit 106. A register 120 is initially loaded prior to the data run to designate which of the plurality of ratio circuits are available to be used during a particular data run for setting sub-commutator ratios. The ratio register 114 in each of the designated ratio circuits is preset to any desired ratio corresponding to the number of cycles of the main frame commutator required for resetting of a sub-commutator.

The register 120 controls a gating circuit 122 by which output pulses from the frame sync generator 34 are selectively directed to the counter 116 of a selected one of the ratio circuits. Thus every time the main frame cycles once, and a new sync word is encountered, the frame sync generator 34 advances the counters 116 in each of the selected ratio circuits.

The output of the decoder 104 selects which one of the ratio circuits is going to be used to address the sub-frame memory 92 in connection with a particular "Jump" operation. To this end, the contents of the counter 116 are gated by a gate circuit 126 in response to one output of the decoder 104. Similarly, the counter in the ratio circuit 108 is gated by a gate circuit 128 in response to another output from the decoder 104. Similarly, another output of the decoder 104 controls a gate circuit 130 on the output of the ratio circuit 110 and another output from the decoder 104 controls a gate circuit 132 on the output of the #N ratio circuit 112. The outputs of these four gating circuits are combined by an OR circuit 134 and applied to the remaining portion of the address register 94 to complete the required address.

In this manner, during the $S_4$ state, the sub-frame memory 92 is addressed to bring out a selected control word into the output register 96. If the order portion of this control word, as decoded by the circuit 98, designates a "Proceed" operation, the control register is set to the $S_9$ state. This is accomplished by applying the "Proceed" operation output from the decoder 98 to an AND circuit 136 associated with the control register 10 together with the output from an OR circuit 138 to which the $S_4$ and $S_5$ states are applied. The output of the AND circuit 136 opens a gate 140 which passes the next clock pulse to the control register 10 to set it to the $S_9$ state.

During the $S_9$ state, a gate 142 is biased open to set one of the input levels to the output distribution gating circuit 78 from the sub-frame memory 92. In this connection, it should be noted that an associative memory may be used to generate a level on any selected output line in response to association between a word in the memory and of the word in the address register 94. Thus the associative memory 92 by virtue of making an association selects one of the output distribution channels for distribution of the particular information data word in the input register. Transfer of the word from the input register through the gate 80 to the output distribution gating circuit 78 takes place in response to the overflow pulse from the counter 62 in the manner already described above.

The output of the decoder 98 may designate a "Branch" operation rather than a "Proceed" operation, in which case the control register 10 is set to the $S_5$ state. To this end, the "Branch" operation level from the decoder 98 is applied to an AND circuit 144 together with the $S_4$ state, the output of the AND circuit 144 controlling a gate 146 by which the next clock pulse is passed to set the control register 10 to the $S_5$ state.

During the $S_5$ state, a gate 148 transfers the address portion of the control word in the output register 96 back to the address register 94 through the OR circuit 134. As a result, a new association is made within the sub-frame memory 92 to select a new control word. If this word calls for a "Proceed" operation, the control register 10 goes into the $S_9$ state. However, the new control word may call for a "Jump" operation requiring the addressing of a sub-sub-frame memory of the associative memory type, indicated at 150. The sub-sub-frame memory has an input register 152 and an output register 160.

The "Jump" operation level from the decoder 98 is applied to an AND circuit 162 together with the output of the OR circuit 138 associated with the control register 10. The output of the AND circuit 162 controls a gate 164 so that the next clock pulse passed by the gate 164 sets the control register 10 to the $S_6$ state. During the $S_6$ state, the address register 152 is loaded. To this end, an AND gate 166 and an AND gate 168 transfer the address from the register 94 to the first two portions of the register 152. The remaining portion of the address in the register 152 is derived from one of the ratio circuits by means of a decoder 178 which decodes the address portion of the control word in the output register 96 through a gate 172. The decoder selects one of a plurality of gates 174, 176, 178 or 180 which respectively couple the contents of the counters 116 in each of the ratio circuits 182 to the register 152.

At this point, it should be noted that the lowest order number ratio circuits are used for establishing the sub-frame ratios and the remaining higher order number ratio circuits are used for the sub-sub-frame memory. As pointed out, any number of ratio circuits may be used, as selected by the register 120, for sub-frame operation. The counter in the ratio circuit associated with the sub-sub-frame is counted in response to cycling of the counter in the associated sub-frame ratio circuit. This may be accomplished by means of a register 184 which designates which ratio circuits are to be used for sub-sub-frame operation. The #N ratio circuit 112 is, for example, always associated with the #1 ratio circuit 106. The #N–1 ratio circuit is then associated with the #2 ratio circuit, etc. so that, for example, when the counter 116 of the #1 ratio circuit compares with the contents of the register 114 and the compare circuit generates a pulse that resets the counter 116 to zero, this same pulse is applied through a gate 186 to step the counter in the #N ratio circuit 112. Similarly, resetting of the counter in the #2 circuit 108 is applied through a gate 188 to advance the counter in the #N–1 ratio circuit, and the reset pulse of the #3 ratio circuit is passed by a gate 190 to advance the counter in the #N–2 ratio circuit, etc.

With the proper address generated in the input register 152, the associative memory 150 makes an association on a particular word in the memory, which word is loaded into the output register 160. The order portion of this control word is then decoded by a decoding circuit 192 and may designate either a "Proceed" operation or a "Branch" operation. Since there is no lower order memory, there is no further "Jump" operation possible. The "Proceed" level from the decoder 192 sets the control register 10 to the $S_{10}$ state by means of an AND circuit 194 which controls a gate 196. During the $S_{10}$ state, a gate 198 controls the output distribution gating circuit in response to the selected level at the associative memory 150.

If the decoder 192 calls for a "Branch" operation, the control register 10 is set to the $S_7$ state by means of an AND circuit 200 which controls the gate 202. During the $S_7$ state, the control register 10 controls a gate 204 by means of which the address portion of the control word in the output register 160 is used to modify the address in the input register 152.

From the above description, it will be seen that each data word as it is shifted into the input register 22 may be distributed to any one of a plurality of output channels according to a control word derived directly from the main frame core memory or indirectly from the sub-frame memory or the sub-sub-frame memory. The data word, whether it is derived from the commutator, a sub-commutator, or a sub-sub-commutator, may or may not be applied to one of the output channels.

In the two latter cases this is because the associative memories 92 and 150 do not necessarily produce an association on all the possible addresses which can be generated in the input registers 94 and 152. Associations are made on only selected addresses according to the desired format of the decommutating process. In this manner, the associative memory provides a means of selecting sub-frame and sub-sub-frame data words according to any desired format. At the beginning of the data run, the sub-frame memory 92 and the sub-sub-frame memory 150 can be loaded according to any predetermined format together with the ratio registers in each of the ratio circuits.

In the former case, a null distribution instruction may be stored in the main frame memory 24 to avoid applying a main commutated word to an output channel. This technique permits the decommutator to pick and choose between a vast amount of input data without any limitation on which ones of the data information words can be selected by the decommutation system. This permits format selection of telemeter information with much greater flexibility than has heretofore been possible with other decommutating systems.

What is claimed is:

1. Apparatus for distributing digitally coded information words, as received serially at a common input, to any selected one of a plurality of output channels, including first means for identifying and counting each word as it is received at the input, second means responsive to the first identifying and counting means for counting each time a predetermined group of information words are received, first addressable memory means for storing a plurality of control words, means responsive to said first counting means for addressing the first memory means in sequence whereby a control word is read out of the first memory means for each information word received, second addressable memory means for storing a plurality of control words, means responsive to the first and second counting means for addressing the second memory means, means responsive to a predetermined control word from the first memory means for initiating read out from the second memory means, and switching means responsive to a particular control word from the second memory means for transferring the data word identified by the first counting means to a selected one of the output channels.

2. Apparatus as defined in claim 1 including additional switching means responsive to a predetermined control word from the first memory means for transferring the data word identified by the first counting means to a selected one of the output channels.

3. Apparatus as defined in claim 2 wherein the second memory means is an associative memory in which each word stored in the second memory means contains its own address.

4. Decommutating apparatus for distributing input data as received to any selected output channel, the apparatus comprising first and second memory means for storing a plurality of digitally coded control words in addressable memory locations, means identifying each unit of input data as received, means for addressing the first memory means in sequence as each unit of input data is received and identified by said identifying means, means responsive to the addressing of the first memory means for reading out the addressed control word from the first memory, means responsive to a first type of coded control word when read out of the first memory for transferring the data unit to a particular output channel identified by a portion of the same control word, means for addressing the second memory means including means responsive to a second type of control word from the first memory means and counting means responsive to the number of received input data units that have been identified by said identifying means, and means responsive to the control word from the second memory means for transferring the data unit to a particular output channel identified by a portion of the same control word.

5. Apparatus as defined in claim 4 wherein the second memory means is an associative memory.

6. In a system in which coded information is received in serial form on a common input, decommutating apparatus for distributing any selected portions of the serial information to any selected ones of a plurality of output channels, said apparatus comprising a register for continuously receiving the coded information and temporarily storing portions thereof as received, a random access memory for storing a plurality of control words in addressable locations, means for addressing said control words in sequence, means sensing when a desired portion of the input data is stored in said temporary storage register for actuating said addressing means to select the next control word in sequence, a first memory register for receiving words from said memory means for decoding the control word in the first memory register, means responsive to a first condition of the decoding means for transferring the selection portion of input data in the temporary storage register to one of the output channels, means responsive to a second condition of the decoding means for reading out another control word into the first memory register from an address designated by the prior control word, a first associative memory for storing a second group of control words, the first associative memory including an address register and an output register, the associative memory comparing the contents of the address register with a portion of each control word stored in the associative memory and transferring the entire control word to the output register when said portion of the control word is the same as the contents of the address register, means responsive to a third condition of the decoding means for setting the address register of the associative memory with an address designated by the control word in said first register, means for decoding the control word in the output register of the first associative memory, means responsive to a first condition of said last-named decoding means for transferring a selected portion of data in the temporary storage register to one of the output channels, and means responsive to a second condition of said last-named decoding means for modifying the address in the address register of the associative memory by a portion of the control word in the output register of the associative memory.

7. Apparatus as defined in claim 6 further including a second associative memory including an address register and an output register, means responsive to a third condition of the decoding means coupled to the output register of the first associative memory for setting the address register of the second associative memory to an address designated by both the control word from the first associative memory and the control word from the random access memory.

8. A decommutator for distributing digitally coded information words as received to any selected output channel comprising first, second, and third memory units for storing control words, means for addressing the first memory unit in response to each data word received by the decommutator, means responsive to a particular control word read out of the first memory means for addressing the second memory unit with the combination of the address applied to the first memory unit to together with an address designated by the particular control word read out of the first memory means, means responsive to a particular control word read out of the second memory means for addressing the third memory unit with the combination of the address applied to the second memory unit together with an address designated by the particular control word read out of the second memory unit, the second and third memory units being associative memory units.

References Cited
UNITED STATES PATENTS 3,238,298 3/1966 Willis _____ 178—50
3,261,001 7/1966 Magnin _____ 340—172.5

ROBERT C. BAILEY, *Primary Examiner.*

R. ZACHE, *Assistant Examiner.*